(12) United States Patent
Lee

(10) Patent No.: US 12,337,811 B2
(45) Date of Patent: Jun. 24, 2025

(54) METHOD AND APPARATUS FOR CONTROLLING BRAKE SYSTEM BASED ON PRECEDING VEHICLE RECOGNITION

(71) Applicant: HYUNDAI MOBIS Co., Ltd., Seoul (KR)

(72) Inventor: Jun Yung Lee, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 246 days.

(21) Appl. No.: 17/859,326

(22) Filed: Jul. 7, 2022

(65) Prior Publication Data
US 2023/0016809 A1    Jan. 19, 2023

(30) Foreign Application Priority Data
Jul. 7, 2021  (KR) .................. 10-2021-0089137

(51) Int. Cl.
*B60T 7/22*    (2006.01)
*B60T 8/171*   (2006.01)
*G06T 7/246*   (2017.01)

(52) U.S. Cl.
CPC ............. *B60T 7/22* (2013.01); *B60T 8/171* (2013.01); *G06T 7/246* (2017.01); *B60T 2201/03* (2013.01); *B60T 2210/32* (2013.01); *G06T 2207/30241* (2013.01); *G06T 2207/30256* (2013.01)

(58) Field of Classification Search
CPC ........ B60T 7/22; B60T 8/171; B60T 2201/03; B60T 2210/32; B60T 8/17557; B60T 2201/022; B60T 2201/081; B60T 2201/083; B60T 8/17558; G06T 7/246; G06T 2207/30241; G06T 2207/30256; G06T 7/73; G06T 2207/30261; B60W 10/18; B60W 30/08; B60W 30/10; B60W 30/14; B60W 40/02; B60W 60/0015; B60W 2420/403; B60W 2554/4044; B60Y 2400/81

See application file for complete search history.

(56) References Cited

U.S. PATENT DOCUMENTS

2019/0283757 A1*  9/2019  Honda .................. B60W 10/18
2023/0040881 A1*  2/2023  Yamada ............ B60W 50/0097

FOREIGN PATENT DOCUMENTS

JP           2022060080 A  *  4/2022  ............ B60W 10/06

* cited by examiner

*Primary Examiner* — Aniss Chad
*Assistant Examiner* — Chase L Cooley
(74) *Attorney, Agent, or Firm* — Morgan, Lewis & Bockius LLP

(57) ABSTRACT

A method and device for controlling brake system based on preceding vehicle recognition are disclosed. The device comprising: a data collecting unit configured to collect front data and rear data of a preceding vehicle, a driving trajectory extracting unit configured to extract a driving trajectory of a lane in which the vehicle is traveling, a preceding vehicle analysis unit configured to determine driving information of the preceding vehicle, a preceding vehicle determining unit configured to determine intervention of the preceding vehicle or deviation of the preceding vehicle with respect to the driving trajectory, and a control unit configured to control the brake system.

16 Claims, 7 Drawing Sheets

METHOD AND APPARATUS FOR CONTROLLING BRAKE SYSTEM BASED ON PRECEDING VEHICLE RECOGNITION

CROSS-REFERENCE TO RELATED APPLICATION

The present application is based on and claims the benefit of priority to Korean Patent Application Number 10-2021-0089137, filed on Jul. 7, 2021 in the Korean Intellectual Property Office, the entire disclosure of which is incorporated herein by reference

TECHNICAL FIELD

The present disclosure relates to a method and device for controlling brake system based on preceding vehicle recognition. More specifically, the present disclosure relates to a method and device for controlling brake system based on preceding vehicle recognition, which simultaneously track the front and rear of a preceding vehicle located in front of a subject vehicle to implement a forward collision-avoidance assist (FCA) function with improved response speed.

BACKGROUND

The information disclosed below in the Background section is to aid in the understanding of the background of the present disclosure, and should not be taken as acknowledgement that this information forms any part of prior art.

In relation to autonomous driving technology, a forward collision-avoidance assist (FCA) technology for preventing a collision between a host vehicle traveling on a road and an object ahead is being studied. For example, when the FCA system determines that collision risk between a host vehicle and a preceding vehicle is greater than or equal to a preset threshold, the FCA system autonomously controls a brake system included in the subject vehicle. Specifically, the FCA system avoids or reduces the risk of collision between the subject vehicle and the object ahead by assisting braking force input by the driver to the brake system or braking the subject vehicle without the driver's intervention. Here, the FCA system uses at least one sensor included in the vehicle to calculate the relative location and relative velocity of the object ahead with respect to the driving vehicle, and determines the collision risk based on the relative position and the relative velocity.

FIG. 1 is a flowchart for explaining an operation process of a conventional forward collision-avoidance assistant (FCA) system.

The conventional FCA system collects data for the rear of the object ahead, for example, the preceding vehicle (S100). The FCA system recognizes an object located ahead using at least one sensor included in the front of the vehicle, for example, a radar and a camera, and outputs the relative position of the object ahead with respect to the vehicle as one representative point or a feature point. Here, when the object ahead is a preceding vehicle, the FCA system extracts a rear feature point that means the center of the rear of the preceding vehicle. Meanwhile, sensor fusion technology that recognizes an object ahead by generating a feature map using a radar and a camera and extracts feature points from the feature map is common in the art, so a detailed description will be omitted.

The conventional FCA system determines whether the rear center of the preceding vehicle enters a driving trajectory (S102). Step S102 may be performed depending on whether the rear feature point exists within the driving trajectory. Meanwhile, the specific method for detecting the self-driving lane (ego-lane) using the data collected from the sensor by the FCA system and extracting the driving trajectory, which means the trajectory of the lane in which the vehicle is traveling, is common in the art, and thus a detailed description thereof will be omitted.

The conventional FCA system controls the brake system included in the vehicle to avoid a collision between the vehicle and the preceding vehicle when it is determined that the rear center of the preceding vehicle enters the driving trajectory, that is, it is a cut-in situation in which the preceding vehicle intervenes in the driving lane of the subject vehicle. Here, the FCA system calculates the risk of collision based on the relative position and relative speed of the preceding vehicle in front of the vehicle, and when the risk of collision is greater than or equal to a preset threshold, it is determined that it corresponds to a collision risk situation and may control the brake system. As described above, a specific method for the FCA system to control the brake system may be a method of directly intervening in vehicle braking without assistance of braking force input by a driver or a driver's intervention.

When it is determined that the rear center of the preceding vehicle deviates from the inside of the driving trajectory, that is, it is determined as a cut-out situation in which the preceding vehicle deviates from the driving lane of the subject vehicle, the conventional FCA system releases the control of the brake system to prevent a collision between the vehicle and the following vehicle caused by unnecessary brake intervention (S108).

FIGS. 2A and 2B are exemplary diagrams for explaining one embodiment in which a conventional FCA system operates in response to intervention or deviation of a preceding vehicle with respect to a driving trajectory of the subject vehicle.

Referring to FIGS. 2A and 2B, the conventional FCA system determines whether the preceding vehicle 202 intervenes in or deviates from the driving trajectory 206 of the road on which the subject vehicle 200 is traveling, and calculates a collision risk between the subject vehicle 200 and the preceding vehicle 202 using only the rear feature point 204. That is, the conventional FCA system estimates whether a collision between the subject vehicle 200 and the preceding vehicle 202 is expected without considering the type, overall length, and driving direction of the preceding vehicle, and then determines the control signal input value for the brake system. However, even though the front of the preceding vehicle 202 has already entered the driving trajectory 206 as shown in FIG. 2A, the FCA system determines that the preceding vehicle 202 does not enter the driving trajectory 206 based on the presence of the rear feature point 204 outside the driving trajectory 206. That is, even though the FCA system needs to be controlled for the brake system due to the risk of collision between the subject vehicle 200 and the preceding vehicle 202, the FCA system may not autonomously perform control of the brake system until the rear feature point 204 is located inside the driving trajectory 206.

Meanwhile, referring to FIG. 2B, although the front of the preceding vehicle 202 already deviated from the driving trajectory 206, the FCA system determines that the preceding vehicle 202 is traveling inside the driving trajectory 206 based on the rear feature point 204 being located inside the driving trajectory 206. In this way, even though the risk of collision between the subject vehicle 200 and the preceding vehicle 202 is significantly reduced since the preceding vehicle 202 is deviating from the driving trajectory 206, the FCA system performs unnecessary control of the brake system until the rear feature point 204 is located outside the driving trajectory 206.

As described above, since the conventional FCA system determines whether the preceding vehicle 202 enters the driving trajectory 206 based only on the rear feature point 204, the intervention of the preceding vehicle 202 cannot be quickly determined in a cut-in situation, and thus control of the brake system is delayed. In addition, since the conventional FCA system determines whether the preceding vehicle 202 deviates from the driving trajectory 206 based only on the rear feature point 204, there is a problem that the deviation of the preceding vehicle 202 may not be quickly determined in a cut-out situation. Accordingly, the conventional FCA system has a problem in that an unnecessary control signal for the brake system is input, driver convenience is reduced due to unnecessary braking, and a collision risk between the subject vehicle 200 and the following vehicle located behind the vehicle is increased.

Therefore, it is necessary to propose a technology capable of adaptively controlling the brake system according to the driving direction of the preceding vehicle 202 in consideration of both the front data and the rear data of the preceding vehicle 202.

SUMMARY

The present disclosure provides a brake system control device which is capable of quickly determining an entry point of a preceding vehicle when the preceding vehicle enters a driving trajectory of the vehicle and quickly controlling the brake system when there is a risk of collision between the vehicle and the preceding vehicle.

Further, the present disclosure provides a brake system control device which is capable of quickly determining a deviation point of a preceding vehicle in a situation where the preceding vehicle deviates from the subject vehicle's driving trajectory and minimizing unnecessary control of the brake system when there is no risk of collision between the vehicles.

According to at least one aspect, the present disclosure provides a device for controlling a brake system of a vehicle. The device includes a data collecting unit configured to collect front data and rear data of a preceding vehicle located in front of the vehicle using at least one camera and at least one optical sensor included in a front of the vehicle, a driving trajectory extracting unit configured to extract a driving trajectory of a lane in which the vehicle is traveling using the camera and the optical sensor, a preceding vehicle analysis unit configured to determine driving information of the preceding vehicle based on image data collected by the camera, a preceding vehicle determining unit configured to determine whether the preceding vehicle intervenes in or deviates from the driving trajectory, and a control unit configured to control the brake system of the vehicle based on a determination made by the preceding vehicle determining unit.

According to another aspect, the present disclosure provides a method for controlling a brake system of a vehicle based on preceding vehicle recognition. The method includes collecting front data and rear data of a preceding vehicle located in front of the vehicle using at least one camera and at least one optical sensor included in a front of the vehicle, extracting a driving trajectory of a lane in which the vehicle is traveling using the camera and the optical sensor, determining driving information of the preceding vehicle based on image data collected by the camera, determining whether the preceding vehicle intervenes in or deviates from the driving trajectory using the driving information on the preceding vehicle, and controlling the brake system of the vehicle based on whether the preceding vehicle intervenes in or deviates from the driving trajectory.

According to one embodiment, the brake system control device can quickly control the brake system in response to a situation in which the preceding vehicle enters the driving trajectory of the subject vehicle, which may prevent a collision between the subject vehicle and the preceding vehicle and improve driving safety of the vehicle.

According to one embodiment, the brake system control device minimizes unnecessary control of the brake system in response to a situation in which the preceding vehicle deviates from the driving trajectory of the subject vehicle, which may improve the driver's convenience.

DETAILED DESCRIPTION

Figure 1:
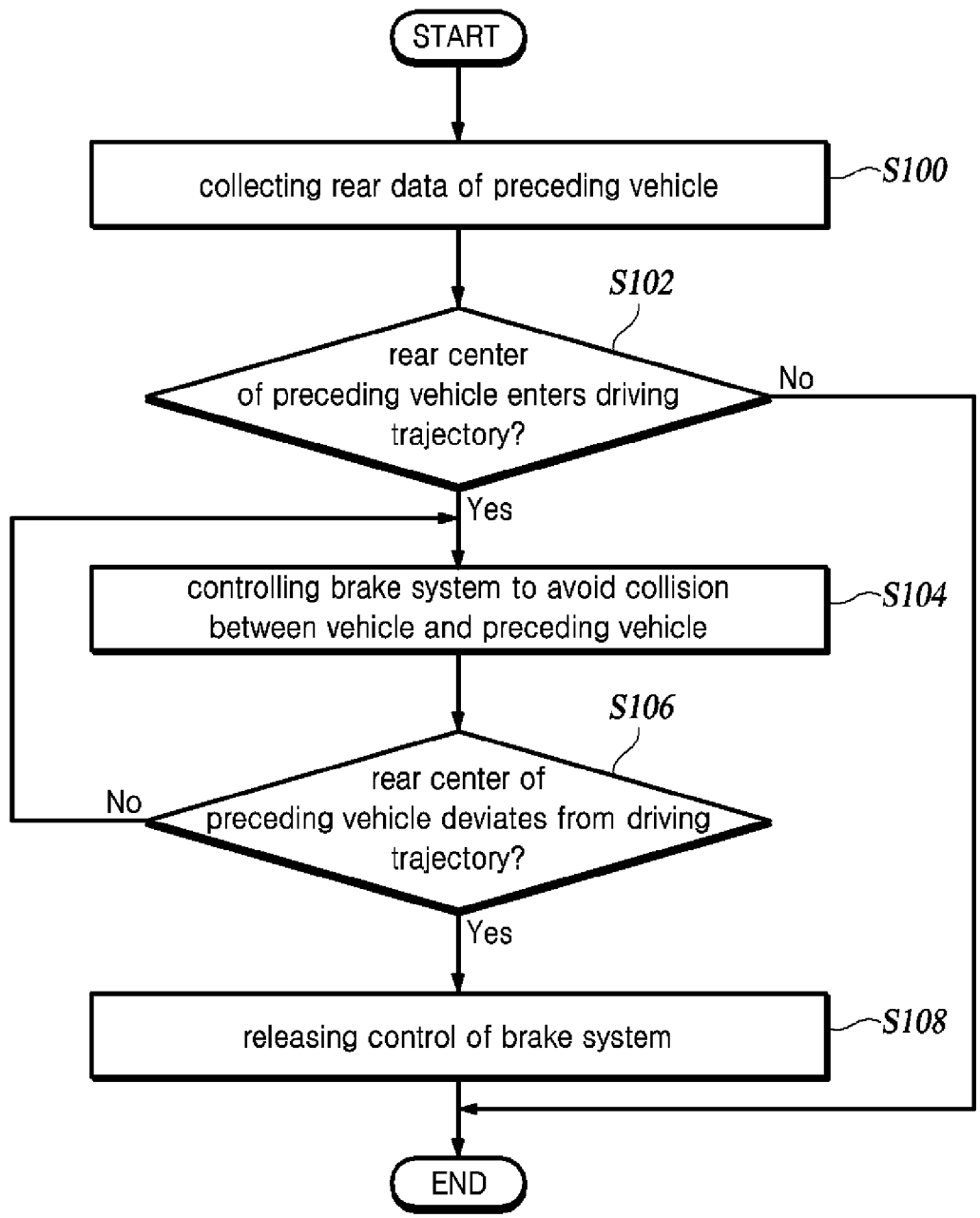
FIG. 1 is a flowchart illustrating an operation process of a conventional forward collision-avoidance assistant (FCA) system.
Figure 2A:
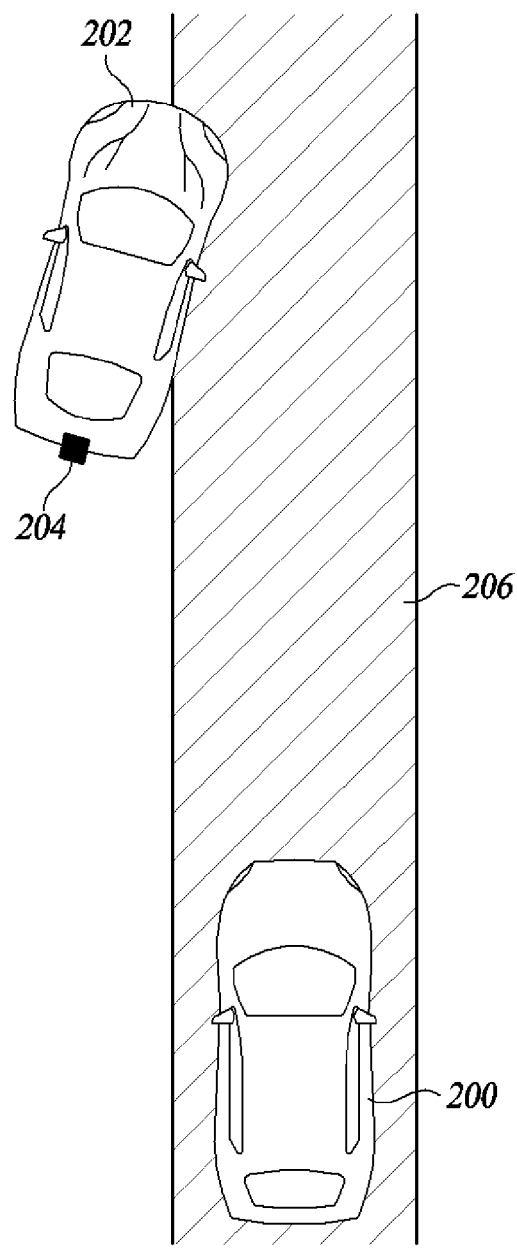
FIGS. 2A and 2B are exemplary diagrams for describing one embodiment in which the conventional FCA system operates in response to intervention or deviation of a preceding vehicle with respect to a driving trajectory of a subject vehicle.
Figure 2B:
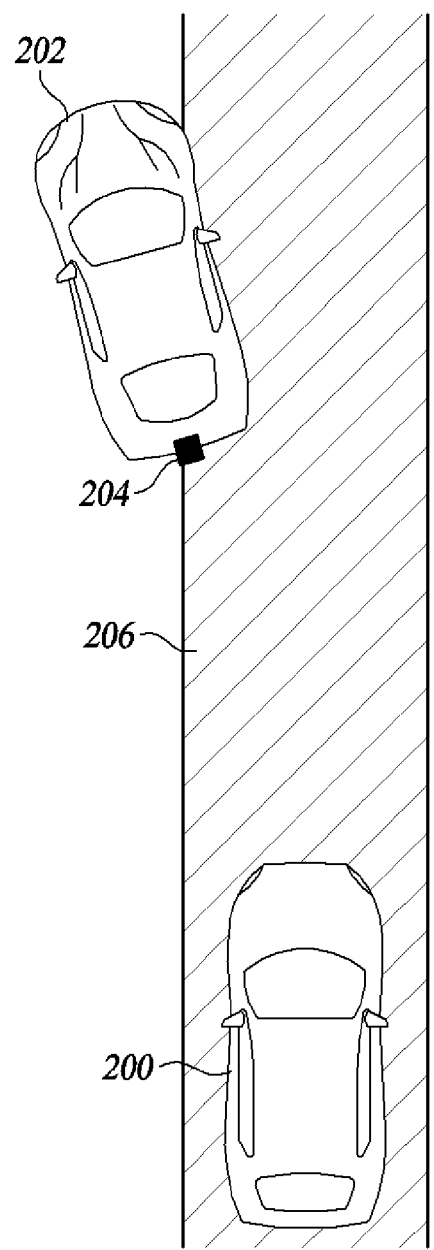

Hereinafter, some embodiments of the present disclosure are described in detail with reference to the accompanying drawings. In the following description, like reference numerals designate like elements, although the elements are shown in different drawings. Further, in the following description of some embodiments, a detailed description of related known components and functions when considered to obscure the subject of the present disclosure are omitted for the purpose of clarity and for brevity.

In describing the components of the embodiments, alphanumeric codes may be used such as first, second, i), ii), a), b), etc., solely for the purpose of differentiating one component from others but not to imply or suggest the substances, the order, or sequence of the components. Throughout the present disclosure, when parts "include" or "comprise" a component, they are meant to further include other components, not to exclude thereof unless there is a particular description contrary thereto. When a component, device, element, unit, module, or the like of the present disclosure is described as having a purpose or performing an operation, function, or the like, the component, device, element, unit or module should be considered herein as being "configured to" meet that purpose or to perform that operation or function.

In relation to the recent implementation of autonomous driving, auxiliary technology of forward collision-avoidance assistant (FCA) has been improved to prevent a collision between a vehicle driving on the road and a vehicle located in front of the vehicle. In one embodiment of the present disclosure, a brake system control method and device based on a preceding vehicle recognition are proposed. More specifically, in response to the intervention or deviation of a preceding vehicle in the subject vehicle's driving trajectory, there are proposed new methods and devices that improve the driving safety of the vehicle by controlling the brake system of the vehicle.

The detailed description to be disclosed below together with the accompanying drawings is to describe an exemplary embodiment of the present disclosure, and is not to show the only embodiment that the present disclosure may be implemented.

Figure 3:
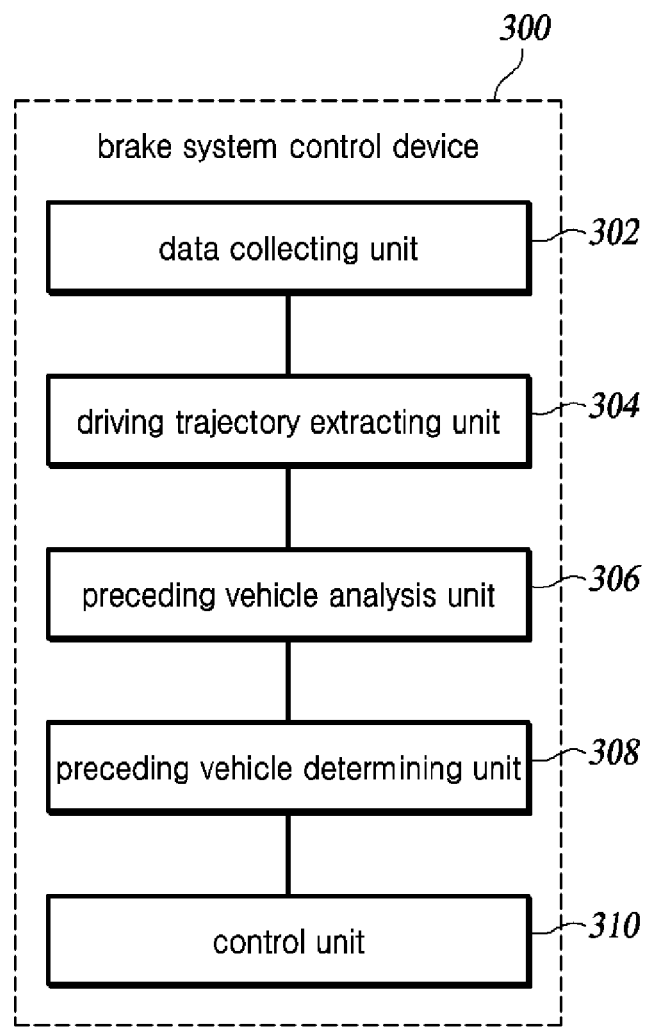
FIG. 3 is a block diagram illustrating a brake system control device according to one embodiment of the present disclosure.

FIG. 3 is a block diagram illustrating a brake system control device according to one embodiment of the present disclosure.

The brake system control device 300 according to one embodiment of the present disclosure includes all or part of a data collecting unit 302, a driving trajectory extracting unit 304, a preceding vehicle analysis unit 306, a preceding vehicle determining unit 308 and a control unit 310.

The brake system control device 300 illustrated in FIG. 3 in accordance with one embodiment of the present disclosure, and all blocks illustrated in FIG. 3 are not essential components. In another embodiment, some blocks included in the brake system control device 300 may be added, changed, or deleted. For example, the brake system control device 300 may further include an engine control unit (not shown). When it is determined that the preceding vehicle 202 deviates from a driving trajectory 206, the engine control unit may increase the engine power so that the subject vehicle 200 may travel according to a driving speed set by the driver. That is, by the operation of the engine control unit, the brake system control device 300 according to one embodiment of the present disclosure may improve the driver's convenience by providing a smart cruise control (SCC) function together with a front collision prevention assistance (FCA) function.

The data collecting unit 302 may be configured to collect front data and rear data of the preceding vehicle 202 located in front of the subject vehicle 200, using at least one camera and at least one optical sensor included in the front of the subject vehicle 200. Here, the optical sensor may be a laser using a pulsed laser beam, but the optical sensor used by the data collecting unit 302 is not limited to the present embodiment.

As described with reference to FIG. 1, the rear data may include a rear feature point 204 indicating a feature point of the rear center of the preceding vehicle 202. The front data may include a front feature point indicating a feature point of the front center of the preceding vehicle 202. One embodiment in which the brake system control device 300 quickly determines whether the preceding vehicle 202 intervenes in or deviates from the driving trajectory 206 by using the front feature point of the preceding vehicle 202 will be described later with reference to FIGS. 4A and 4B. Meanwhile, a specific method of extracting a feature point of an object ahead from data obtained by a camera and an optical sensor is general in the art, and thus a detailed description thereof will be omitted.

The driving trajectory extracting unit 304 may be configured to extract the driving trajectory 206 of the lane in which the subject vehicle 200 is traveling using a camera and an optical sensor. A specific method of detecting an ego-lane and extracting the driving trajectory 206 from data obtained by a camera and an optical sensor is general in the art, and thus a detailed description thereof will be omitted.

The preceding vehicle analysis unit 306 may be configured to determine driving information of the preceding vehicle 202 based on image data collected by the camera. Here, the driving information of the preceding vehicle 202 includes an overall length of the preceding vehicle 202 and a driving direction of the preceding vehicle 202.

In one embodiment, the preceding vehicle analysis unit 306 may be configured to extract the front feature point by using the rear feature point 204 and the type, overall length, and driving direction of the preceding vehicle. The brake system control device 300 according to one embodiment of the present disclosure additionally considers the overall length and driving direction of the preceding vehicle 202 in order to control the brake system in response to intervention or deviation of the preceding vehicle 202, which may improve a response speed compared with a conventional FCA system. This will be described later with reference to FIGS. 4A and 4B.

The preceding vehicle determining unit 308 may be configured to determine the intervention of the preceding vehicle 202 or the deviation of the preceding vehicle 202 with respect to the driving trajectory 206 using information on the preceding vehicle 202.

Specifically, the preceding vehicle determining unit 308 determines that the preceding vehicle 202 intervenes in the driving trajectory 206 from a time point when the front feature point is present inside the driving trajectory 206 and the rear feature point 204 is present outside the driving trajectory. On the other hand, the preceding vehicle determining unit 308 determines that the preceding vehicle 202 deviates from the driving trajectory 206 from a time point when the front feature point is present outside the driving trajectory and the rear feature point 204 is present inside the driving trajectory 206.

In this way, since the preceding vehicle determining unit 308 determines whether the preceding vehicle 202 intervenes in or deviate from the driving trajectory 206 based on the rear data and the front data, the response speed of the brake system control device 300 may be improved compared to the conventional FCA system. A detailed operation of the preceding vehicle determining unit 308 will be described later with reference to FIGS. 4A and 4B.

When it is determined that the preceding vehicle 202 intervenes in the driving trajectory 206, the control unit 310 may be configured to control a braking force input to at least one wheel included in the subject vehicle 200 so that the subject vehicle 200 decelerates to avoid collision with the preceding vehicle 202. In another embodiment, when it is determined that the preceding vehicle 202 deviates from the driving trajectory 206, the control unit 310 may be configured to reduce the magnitude of a control signal input to the brake system to a preset minimum value or releases an autonomous control function for the brake system in order to prevent a collision between the subject vehicle 200 and a following vehicle located behind the subject vehicle 200.

In another embodiment, the control unit 310 may be configured to increase a braking force input to at least one wheel included in the vehicle 200 when the overall length of the preceding vehicle 202 is greater than a preset value, for example, the type of the preceding vehicle 202 is a trailer or a dump truck, in order to avoid a collision between the subject vehicle 200 and the preceding vehicle 202. In this way, the control unit 310 increases the braking force input to the subject vehicle 200 when the risk of collision is high or the amount of impact predicted due to the collision is large in consideration of the overall length of the preceding vehicle 202, which may improve driving safety.

Figure 4A:
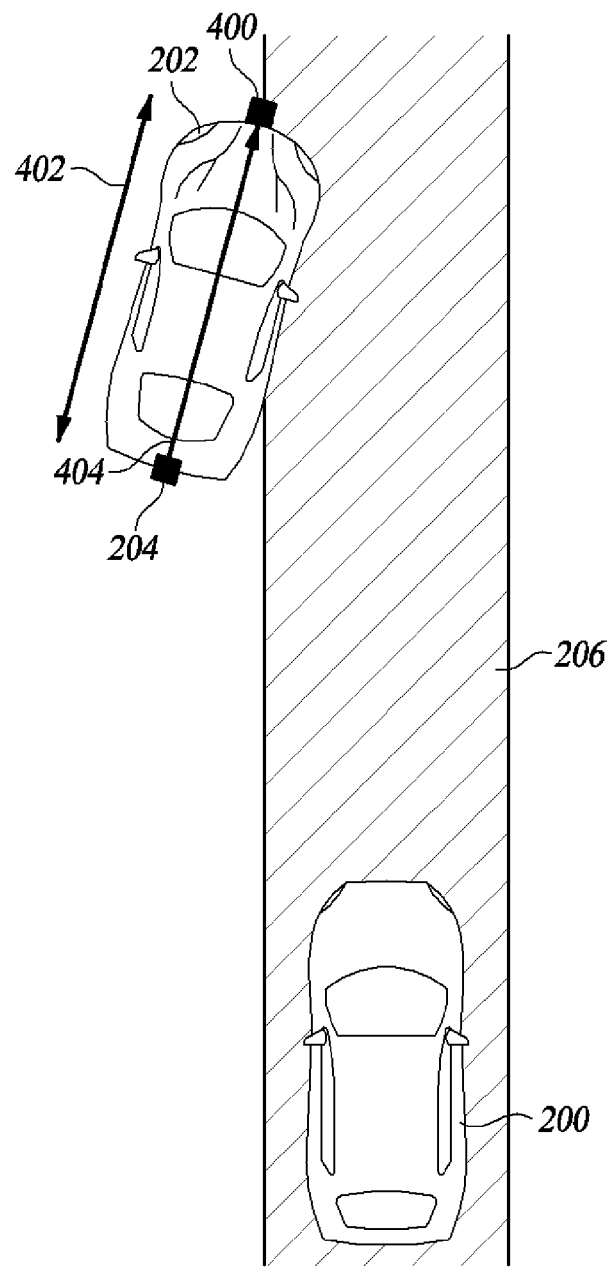
FIGS. 4A and 4B are exemplary diagrams illustrating one embodiment in which the brake system control device according to one embodiment of the present disclosure operates in response to intervention or deviation of a preceding vehicle with respect to the driving trajectory of the subject vehicle.
Figure 4B:
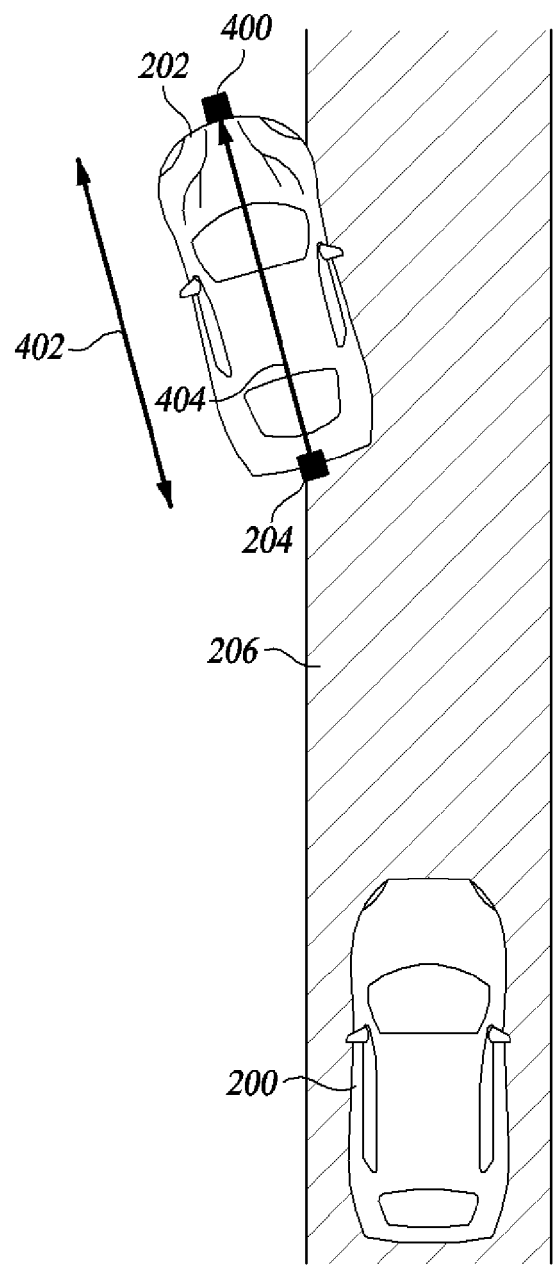

FIGS. 4A and 4B are exemplary diagrams illustrating one embodiment in which the brake system control device according to one embodiment of the present disclosure operates in response to intervention or deviation of a preceding vehicle with respect to the driving trajectory of the subject vehicle.

Referring to FIG. 4A, the preceding vehicle 202 is entering the driving trajectory 206 of the lane in which the subject vehicle 200 is traveling. In the conventional FCA system, since the rear feature point 204 of the preceding vehicle 202 is still located outside the driving trajectory 206, it is inevitably determined that the preceding vehicle 202 does not intervene inside the driving trajectory 206.

In contrast, in the brake system control device 300 according to one embodiment of the present disclosure, even if the rear feature point 204 is located outside the driving trajectory 206, since the front feature point 400 is located inside the driving trajectory 206, it may be determined that the preceding vehicle 202 intervenes in the driving trajectory 206. Thereafter, the brake system control device 300 calculates a collision risk between the preceding vehicle 202 and the subject vehicle 200, and controls the brake system when the collision risk is greater than or equal to a predetermined threshold to prevent a collision between the subject vehicle 200 and the preceding vehicle 202. In another embodiment, the brake system control device 300 may calculate a driving direction 404 of the preceding vehicle 202 based on the positions of the rear feature point 204 and the front feature point 400, and may autonomously control the brake system of the subject vehicle 200 in response to a case where the driving direction of the preceding vehicle 202 approaches the lane. In another embodiment, the brake system control device 300 may reduce the risk of collision between the subject vehicle 200 and the vehicle 202 by increasing the braking force input to the subject vehicle 200 when the overall length 402 of the vehicle 202 is greater than a preset value.

As described above, since the brake system control device 300 determines whether the preceding vehicle 202 intervenes in the driving trajectory 206 by considering both the front data and the rear data of the preceding vehicle 202, the cut-in situation in which the preceding vehicle 202 enters the driving trajectory 206 may be recognized more quickly compared to the conventional FCA system.

Referring to FIG. 4B, the preceding vehicle 202 is deviating from the outside of the driving trajectory 206 of the lane in which the subject vehicle 200 is traveling. In the conventional FCA system, since the rear feature point 204 of the preceding vehicle 202 is still located inside the driving trajectory 206, it is inevitably determined that the preceding vehicle 202 is not deviating from the driving trajectory 206.

In contrast, in the brake system control device 300 according to one embodiment of the present disclosure, even if the rear feature point 204 is located inside the driving trajectory 206, since the front feature point 400 is located outside the driving trajectory 206, it may be determined that the preceding vehicle 202 is deviating from the driving trajectory 206. Accordingly, the brake system control device 300 calculates a collision risk between the preceding vehicle 202 and the subject vehicle 200, and when it is determined that the collision risk is very low, the brake system control device 300 minimizes control of the brake system to prevent a collision between the subject vehicle 200 and the following vehicle. In another embodiment, the brake system control device 300 may calculate the driving direction of the preceding vehicle 202 based on the positions of the rear feature point 204 and the front feature point 400, and may minimize the control on the brake system of the subject vehicle 200 in response to a case where it is determined that the driving direction 404 of the preceding vehicle 202 is deviating from the lane where the subject vehicle 200 is travelling. As described above, since the brake system control device 300 determines whether the preceding vehicle 202 is deviating from the driving trajectory 206 in consideration of both the front data and the rear data of the preceding vehicle 202, the cut-out situation in which the preceding vehicle 202 is deviating from the driving trajectory 206 may be recognized more quickly compared to the conventional FCA system.

Figure 5:
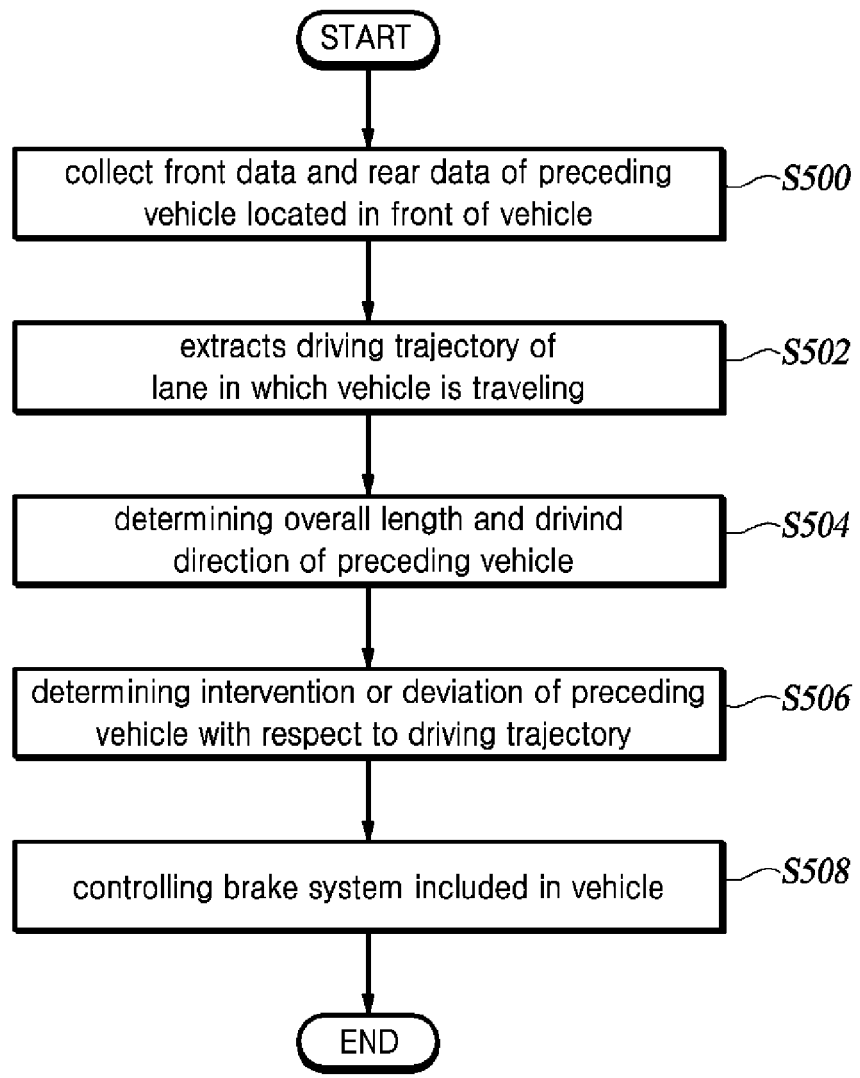
FIG. 5 is a flowchart illustrating each process included in a brake system control method according to one embodiment of the present disclosure.

FIG. 5 is a flowchart illustrating each process included in a brake system control method according to one embodiment of the present disclosure.

Since each process included in the brake system control method has been described in detail with reference to FIGS. 3, 4A and 4B, redundant descriptions thereof will be omitted.

The brake system control device 300 may collect front data and rear data of the preceding vehicle 202 located in front of the subject vehicle 200 by using at least one camera and at least one optical sensor included in the front of the subject vehicle 200 (S500).

The brake system control device 300 may extract the driving trajectory 206 of the lane in which the subject vehicle 200 is traveling using the camera and the optical sensor (S502).

The brake system control device 300 may determine driving information of the preceding vehicle 202 based on the front data and the rear data (S504).

The brake system control device 300 may determine intervention of the preceding vehicle 202 or deviation of the preceding vehicle 202 with respect to the driving trajectory 206 using information on the preceding vehicle 202 (S506).

The brake system control device 300 may control the brake system of the subject vehicle 200 based on the determination in step S506 (S508).

Although it is described in FIG. 5 that the processes are sequentially executed, this is merely illustrative of the technical idea of some embodiments of the present disclosure. In other words, since an ordinary skilled person in the art to which the embodiments of the present disclosure pertain may make various modifications and changes by changing the processes described in FIG. 5 or performing one or more of the processes in parallel without departing from the essential characteristics of the embodiments of the present disclosure, the processes described in FIG. 5 are not limited to a time-series order.

Various implementations of the device and the method described herein may be implemented by a programmable computer. Here, the computer includes a programmable processor, a data storage system (including a volatile memory, a nonvolatile memory, or another type of storage system or a combination thereof), and at least one communication interface. For example, the programmable computer may be one of a server, a network device, a set-top box, a built-in device, a computer expansion module, a personal computer, a laptop, a personal data assistant (PDA), a cloud computing system, and a mobile device. The computer may perform various functions of all or part of the above units 302, 304, 306, 308 and 310. The data collecting unit 302, driving trajectory extracting unit 304, preceding vehicle analysis unit 306, preceding vehicle determining unit 308 and control unit 310 described above may be implemented with software instructions executed on, e.g., the programmable processor.

Although exemplary embodiments of the present disclosure have been described for illustrative purposes, those of having ordinary skill in the art would appreciate that various modifications, additions, and substitutions are possible, without departing from the idea and scope of the present disclosure. Therefore, exemplary embodiments of the present disclosure have been described for the sake of brevity and clarity. The scope of the technical idea of the embodiments of the present disclosure is not limited by the illustrations. Accordingly, one of ordinary skill in the art would understand the scope of the present disclosure is not to be limited by the above explicitly described embodiments.

What is claimed is:

1. A device for controlling a brake system of a vehicle, the device comprising:
    a data collecting unit configured to collect front data and rear data of a preceding vehicle located in front of the vehicle using at least one camera and at least one optical sensor included in a front of the vehicle;
    a driving trajectory extracting unit configured to extract a driving trajectory of a lane in which the vehicle is traveling using the at least one camera and the at least one optical sensor;
    a preceding vehicle analysis unit configured to determine driving information of the preceding vehicle based on image data collected by the at least one camera, the driving information of the preceding vehicle including an overall length of the preceding vehicle;
    a preceding vehicle determining unit configured to determine whether the preceding vehicle intervenes in the driving trajectory or deviates from the driving trajectory; and
    a control unit configured to control the brake system of the vehicle based on a determination made by the preceding vehicle determining unit
    wherein the control unit increases a braking force input to at least one wheel of the vehicle to avoid a collision between the vehicle and the preceding vehicle when the overall length of the preceding vehicle is greater than a preset value.

2. The device of claim 1, wherein the driving information of the preceding vehicle further includes a type of the preceding vehicle and a driving direction of the preceding vehicle.

3. The device of claim 2, wherein the preceding vehicle analysis unit extracts the front feature point for the preceding vehicle using the rear feature point and the driving information of the preceding vehicle.

4. The device of claim 1, wherein
    the front data includes a front feature point indicating a feature point with respect to a front center of the preceding vehicle, and
    the rear data includes a rear feature point indicating a feature point for a rear center of the preceding vehicle.

5. The device of claim 4, wherein the preceding vehicle determining unit
    determines that the preceding vehicle deviates from the driving trajectory from a time when the front center point is outside the driving trajectory and the rear center is present in the driving trajectory.

6. The device of claim 5, wherein the control unit releases an autonomous control function on the brake system in order to prevent a collision between a following vehicle located behind the vehicle and the vehicle due to unnecessary braking of the vehicle when the preceding vehicle determining unit determines that the preceding vehicle deviates from the driving trajectory.

7. The device of claim 4, wherein the preceding vehicle determining unit determines that the preceding vehicle intervenes in the driving trajectory from a time point when the front feature point is present in the driving trajectory and the rear feature point is present outside the driving trajectory.

8. The device of claim 7, wherein the control unit controls a braking force input to at least one wheel of the vehicle so that the vehicle decelerates to avoid collision with the preceding vehicle when the preceding vehicle determining unit determines that the preceding vehicle intervenes in the driving trajectory.

9. A method for controlling a brake system of a vehicle based on preceding vehicle recognition, the method comprising:
    collecting front data and rear data of a preceding vehicle located in front of the vehicle using at least one camera and at least one optical sensor included in a front of the vehicle;
    extracting a driving trajectory of a lane in which the vehicle is traveling using the at least one camera and the at least one optical sensor;
    determining driving information of the preceding vehicle based on image data collected by the at least one camera, the driving information of the preceding vehicle including an overall length of the preceding vehicle;
    determining whether the preceding vehicle intervenes in the driving trajectory or deviates from the driving trajectory using the driving information on the preceding vehicle; and
    controlling the brake system of the vehicle based on whether the preceding vehicle intervenes in or deviates from the driving trajectory,
    wherein: the controlling includes
    increasing a braking force input to at least one wheel of the vehicle to avoid a collision between the vehicle and the preceding vehicle when the overall length of the preceding vehicle is greater than a preset value.

10. The method of claim 9, wherein the driving information of the preceding vehicle further includes a type of the preceding vehicle.

11. The method of claim 10, wherein the extracting includes extracting the front feature point for the preceding vehicle using the rear feature point and the driving information of the preceding vehicle.

12. The method of claim 9, wherein
    the front data includes a front feature point indicating a feature point with respect to a front center of the preceding vehicle, and
    the rear data includes a rear feature point indicating a feature point for a rear center of the preceding vehicle.

13. The method of claim 12, wherein the determining whether the preceding vehicle intervenes in the driving trajectory or deviates from the driving trajectory includes
    determining that the preceding vehicle deviates from the driving trajectory from a time point when the front center is outside the driving trajectory and the rear center is present in the driving trajectory.

14. The method of claim 13, the controlling includes releasing an autonomous control function on the brake system in order to prevent a collision between a following vehicle located behind the vehicle and the vehicle due to unnecessary braking of the vehicle when the preceding vehicle determining unit determines that the preceding vehicle deviates from the driving trajectory.

15. The method of claim 12, wherein the determining whether the preceding vehicle intervenes in the driving trajectory or deviates from the driving trajectory includes
determining that the preceding vehicle intervenes in the driving trajectory from a time point when the front feature point is present in the driving trajectory and the rear feature point is present outside the driving trajectory.

16. The method of claim 15, the controlling includes controlling a braking force input to at least one wheel of the vehicle so that the vehicle decelerates to avoid collision with the preceding vehicle when the preceding vehicle determining unit determines that the preceding vehicle intervenes in the driving trajectory.

* * * * *